Aug. 18, 1959   W. H. NICKELS   2,900,148
LOCKING DEVICE
Filed May 29, 1958

INVENTOR.
WILLIAM H. NICKELS
BY Victor J. Evans & Co.
ATTORNEYS

United States Patent Office 2,900,148
Patented Aug. 18, 1959

2,900,148

LOCKING DEVICE

William H. Nickels, Carrizozo, N. Mex.

Application May 29, 1958, Serial No. 738,742

2 Claims. (Cl. 244—83)

This invention relates to a locking device, and more particularly to a locking device for an airplane.

The object of the invention is to provide a locking device for selectively maintaining movable members stationary in their desired positions.

Another object of the invention is to provide a locking device which is adapted to be used in conjunction with control sticks or control shafts of an airplane, so that when the device is in the locked or tightened position, various movable members such as aircraft elevators, will be held stationary so that such elevators or other moving parts will not be affected or moved by gusts of wind or the like.

A further object of the invention is to provide a locking device which is extremely simple and inexpensive to manufacture.

Other objects and advantages will be apparent during the course of the following description.

In the accompanying drawing, forming a part of this application, and in which like numerals are used to designate like parts throughout the same:

Figure 1:
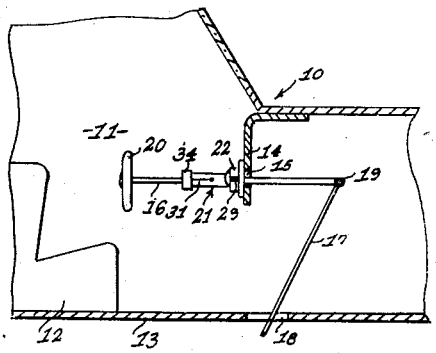
Figure 1 is a fragmentary section of the locking device of the present invention in use.
Figure 3:
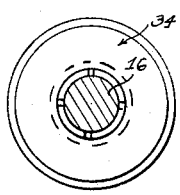
Figure 3 is a sectional view taken on line 3—3 of Figure 2.

Referring in detail to the drawing, the numeral 10 indicates a portion of a conventional airplane or aircraft, Figure 1, and the airplane 10 includes the usual cabin 11, seat 12, and floor 13. There is further provided the usual instrument panel 14 which has an opening 15 therein, and a control shaft or stick 16 extends through the opening 16. The numeral 17 indicates a column or post which extends through an opening 18 in the floor 13, and the column 17 is connected to the shaft 16 as at 19. The numeral 20 indicates the usual hand engaging member on the end of the shaft 16.

Figure 2:
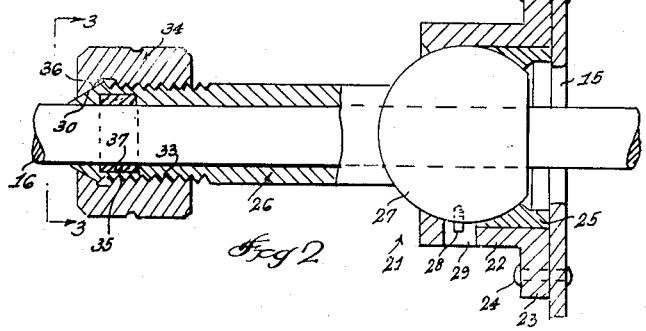
Figure 2 is a fragmentary enlarged sectional view illustrating the locking device of the present invention.
Figure 5:
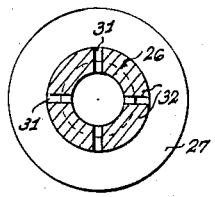
Figure 5 is a sectional view taken on line 5—5 of Figure 4.
Figure 4:
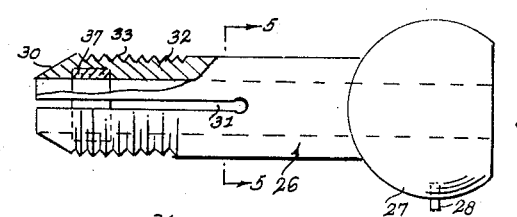
Figure 4 is an elevational view, with parts broken away and in section, showing the body member.

The present invention is directed to a locking device, and the locking device is indicated generally by the numeral 21. As shown in the drawing, the locking device 21 includes a bracket 22 which has a flange 23 secured to the instrument panel 14 in any suitable manner, as for example by means of securing elements 24. A bearing ring member 25 is mounted in the bracket 22, Figure 2, and the numeral 26 indicates a body member which has a rounded or spherical base piece 27 which engages the interior of the bearing member 25. The numeral 28 indicates a pin which extends into the base piece 27, and the bracket 22 is provided with a recess or opening 29 that provides clearance for the pin 28.

The body member 26 is further provided with a tapered edge 30, and the body member 26 is also provided with a plurality of spaced parallel slots 31 which define therebetween clamping sections 32. The exterior portion of the body member 26 is threaded as at 33, and the numeral 34 indicates a knurled locking collar which has a threaded interior 35 for threadedly engaging the threaded portion 33 of the body member 26. The collar 24 is also provided with a beveled portion 36 for coaction with the tapered portion 30 of the body member 26 as for example when the parts are in assembled or tightened position. The numeral 37 indicates clamps which may be made of any suitable material such as a suitable plastic, and the clamps 37 are arranged within the body member 26, the clamps 37 engaging the exterior of the control shaft 16.

From the foregoing, it is apparent that there has been provided a locking device which is especially suitable for use on aircraft. According to the present invention, it is to be noted that the bracket 22 can be attached to the instrument panel 14 by means of the securing elements 24, and the bracket 22 has the bearing member 25 therein. The rounded portion or base 27 of the body member 26 is rotatably arranged in the bearing member 25, and it will be noted that the body member 26 and base 27 are hollow whereby the control shaft 16 can readily extend therethrough. When the locking device is not being used, the collar 34 can be loosened on the threaded portion 33 so that the pilot on the seat 12 can readily grip the member 20 and move the control shaft 16 in the usual manner. That is, the control shaft 16 can be used for operating the column 17, and the column 17 in turn can be used to actuate or move any desired member such as the usual elevators at the rear of the airplane 10.

Thus, with the collar 34 loose, normal operation of the aircraft flight control apparatus is possible. However, when it is desired to utilize the locking device 21, it is only necessary to tighten the collar 34 on the threaded portion 33 and this will move the sections 32 inwardly, this movement of the sections 33 being possible due to the provision of the plurality of spaced parallel slots or cutouts 31.

The clamps 37 are mounted within the body member 26 so that as the collar 34 is tightened on the threaded portion 33, the clamps 32 will be squeezed or tightened into engagement with the shaft 16 so that accidental movement of the shaft 16 and its associated parts will be prevented. Thus, even though gusts of wind may strike or engage the elevators or movable parts of the aircraft, with the collar 34 in tightened or locking position, accidental movement of the elevators or other parts will be prevented so that the locking device will act as a safety feature whereby the aircraft can be flown or operated in a more safe manner.

Figure 6:
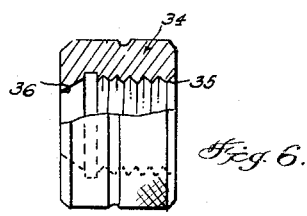
Figure 6 is an elevational view of the locking collar, with parts broken away and in section.

The exterior of the collar 34 is knurled as shown in Figure 6 for example whereby the collar can be more readily manually turned as for example when this collar is being loosened or tightened.

The parts can be made of any suitable material and in different shapes or sizes. While the present invention has been described for use with an aircraft, it is to be understood that it is applicable to different types of mechanisms.

The pin 28 locks the unit from rotating but permits movement in a vertical plane as the control shaft 16 moves in and out. It is to be noted that an end of the body member 26 is tapered as at 30, while the collar 34 has a beveled portion 36, so that the portions 30 and 36 can coact to exert the necessary clamping action on the shaft 16.

The present invention is especially suitable as a gust lock on an airplane.

In use the control column 17 is pulled to the desired location, and then the knurled nut or collar 34 is tightened so as to cause the sections 32 to close whereby the shaft 16 will be gripped to prevent any further movement of the shaft. The locking device can be overridden in case it is left tight accidentally, so that there will be no crashes, accidents or the like. Different types of adapters can be used, so as to permit the device to be used on different types of aircraft.

The pin 28 has the single purpose of preventing the body 26, with the base 27, from rotating as locking collar 34 is actuated, to tighten or loosen locking device in any application.

The member 37 may consist of two semicircular sections and it is only necessary to use this member when very heavy loads are held since it provides greater gripping force with less rotative effort on the collar 34. In cheaper models, the member 34 may be omitted.

Minor changes and shapes, size and rearrangement of details coming within the field of invention claimed may be resorted to in actual practice, if desired.

I claim:

1. In an airplane including a cabin having an instrument panel therein, and said airplane further including a floor board, a column extending through said floor board, there being an opening in said instrument panel, a control shaft extending through the opening in said instrument panel and connected to said column, a bracket having a flange secured to said instrument panel, a bearing member mounted in said bracket, a hollow body member mounted on said control shaft and having a rounded base on an end thereof engaging said bearing member, there being a recess in said bracket, a pin extending through said recess and engaging said base piece, an end of said body member being tapered, there being a plurality of spaced parallel slots in said body member, an end portion of said body member being threaded externally, a knurled collar arranged in engagement with the threaded portion of said body member, said collar being provided with a beveled portion for coaction with the tapered end of the body member, clamps mounted within said body member and engaging the outer periphery of the control shaft, and said collar adapted to be loosened or tightened on said body member.

2. In a locking device, a control shaft, a bracket having a flange adapted to be secured to a supporting structure, a bearing member mounted in said bracket, a hollow body member mounted on said control shaft and said body member having a rounded base piece on an end thereof engaging said bearing member, there being a recess in said bracket, a pin extending through said recess and engaging said base piece, an end of said body member being tapered, there being a plurality of spaced parallel slots in said body member, an end portion of said body member being threaded externally, a knurled collar arranged in engagement with the threaded portion of said body member, said collar being provided with a beveled portion for coaction with the tapered end of the body member, and clamps mounted within said body member and engaging the outer portion of the control shaft.

References Cited in the file of this patent

UNITED STATES PATENTS

| | | |
|---|---|---|
| 2,499,993 | Gregg | Mar. 7, 1950 |
| 2,534,527 | Myers | Dec. 19, 1950 |
| 2,542,434 | Russell | Feb. 20, 1951 |

FOREIGN PATENTS

| | | |
|---|---|---|
| 317,770 | Germany | Dec. 29, 1919 |